E. ANDREWS & W. TUCKER.
Assignors by mesne Assignments to S. E. & A. Spring & J. C. Jordan.
MACHINE FOR MAKING MATCH-BLOCKS.
No. 7,825. Reissued July 31, 1877.
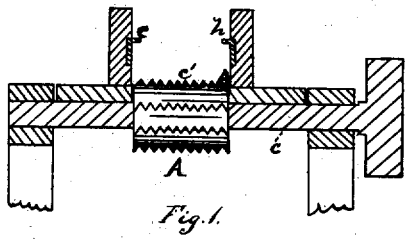
Fig. 1.
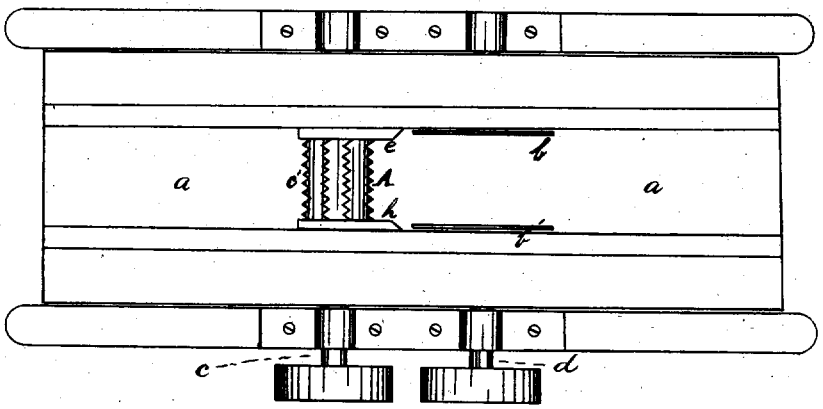
Fig. 2.
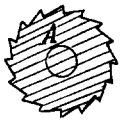
Witnesses:
Frank H. Jordan,
Edgar S. Brown
Inventors:
Emery Andrews
and
Wm. Tucker
per atty. Wm. Henry Clifford
N. PETERS, PHOTO-LITHOGRAPHER, WASHINGTON, D. C.

UNITED STATES PATENT OFFICE.

EMERY ANDREWS, OF PORTLAND, MAINE, AND WILLIAM TUCKER, OF PHILADELPHIA, PENNSYLVANIA, ASSIGNORS, BY MESNE ASSIGNMENTS, TO SAMUEL E. SPRING, ANDREW SPRING, AND JAMES C. JORDAN, OF PORTLAND, MAINE.

IMPROVEMENT IN MACHINES FOR MAKING MATCH-BLOCKS.

Specification forming part of Letters Patent No. 96,764, dated November 16, 1869; Reissue No. 7,825, dated July 31, 1877; application filed October 29, 1873.

*To all whom it may concern:*

Be it known that EMERY ANDREWS and WILLIAM TUCKER, of Portland and Philadelphia, in the counties of Cumberland and Philadelphia and States of Maine and Pennsylvania, respectively, have invented certain new and useful Improvements in Machines for Making Match-Blocks; and we do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1 is a transverse section, showing the notching-cylinder in full and the knives which perform the operation of cutting. Fig. 2 is a top plan.

A is a vertical transverse section of a notching-cylinder.

Letters Patent of the United States have been granted to us for a match-machine, and also for a match-card, numbered (the latter) 63,197; Reissue No. 6,276, said card being "so scalloped or notched that each of the teeth can separately receive the sulphur and the igniting compound;" and the object of this invention is to provide a device by which the said scallops or teeth can be easily formed by removing from one end of the match wood or block certain portions of the substance thereof, so as to leave the teeth or fire ends of the matches, when completed, each separate from the other.

In the present illustration of this invention the drawings show the operating parts of our invention, which may be set upon an appropriate frame of such size as is convenient and necessary.

Set upon the said frame is a trough or box, *a*, which box incloses the saws and the notching-cylinder A. Set in the frame are the two shafts *c d*, to one of which is rigidly attached the notcher A, to the other the saws *b b'*, as illustrated. The saws *b b'* are rigidly attached to the shaft *d*, which shaft is revolved by a band, gearing, or other well-known means. They project up through slits on the sides of the trough *a*, above the top or table of the machine, to about half their diameter. Thus, when a card equal in width to the width of the trough *a* is passed along in said trough to the saws, the edges thereof will be cut by the saws, so that the card will be equal in width to the distance between the saws.

The trough *a* in front of the two circular saws is filled with match cards or blocks of varying widths, greater than that which they are intended to have after being notched. They are then moved along the trough until they reach the two circular saws *b b'*. By these saws the cards or blocks are all cut to the same width. Passing from the saws, they are then submitted to the operation of the cylindrical notcher, by the operation of which a pointed and tapering shape is imparted to the end of the match, which is subsequently loaded with the igniting substance.

The peculiar formation of the notcher A consists in longitudinal rows of projecting pointed teeth, the rows extending from one to the other end of the cylinder, and being placed as near together as convenient, or as practice may determine.

As the revolving notching-cylinder A comes in contact with the match cards or blocks, which are driven along the trough and into contact with the notcher, the action of the rows of projecting teeth thereon is to chip out or remove from the ends certain portions of the substance thereof, corresponding in shape to the spaces between said teeth.

This operation of the notcher gives to the matches the tapering or pointed shape alluded to above.

A reference to Fig. 1 of the drawings will illustrate the shape of the teeth and intermediate spaces.

*e h* show lips or shoulders on each side of the box or trough, immediately over the notching-cylinder.

As the cards or blocks pass in succession along through the box their edges are caught by these lips and kept in the proper position to be notched—that is to say, they are neither drawn down through the box, nor forced up out of it by the action of the notcher, but are kept in the proper position relative to the cylinder.

What we claim by this invention, and desire to secure by Letters Patent, is—

1. The knives or cutters to chip out or remove from one end of the wood, to be used for match blank or card, certain portions thereof, at regular intervals, to form the fire end of the matches, in combination with suitable device or devices for trimming one or both edges of said wood at one operation, substantially as described.

2. The combination of the notching teeth or cylinder A, the saws *b b'*, the lips or shoulders *e h*, and the trough *a*, substantially as and for the purposes set forth.

3. The combination of the notching teeth with the saws *b b'*, and a trough or means for feeding the blanks or cards, substantially as described.

4. The combination of the moving notching-teeth operating on the lower end of the blank, as herein described, with the guides or lips *c d*, and suitable means for feeding the blocks or blanks, substantially as set forth.

In testimony that we claim the foregoing we have hereunto set our hands this 31st day of January, 1874.

SAMUEL E. SPRING.
ANDREW SPRING.
JAS. C. JORDAN.

Witnesses:
S. R. SMALL,
GEO. M. THOMAS.